Jan. 3, 1961  R. W. SEXTON  2,966,958
GAS TREATING DEVICE

Filed Dec. 16, 1957  2 Sheets-Sheet 1

INVENTOR
ROBERT W. SEXTON
BY
ATTORNEY

Jan. 3, 1961 R. W. SEXTON 2,966,958
GAS TREATING DEVICE
Filed Dec. 16, 1957 2 Sheets-Sheet 2

INVENTOR.
ROBERT W. SEXTON
BY
ATTORNEY

United States Patent Office 2,966,958
Patented Jan. 3, 1961

2,966,958
GAS TREATING DEVICE

Robert W. Sexton, Louisville, Ky., assignor to American Air Filter Company, Inc., Louisville, Ky., a corporation of Delaware Filed Dec. 16, 1957, Ser. No. 703,136

15 Claims. (Cl. 183—14)

This invention relates to a gas treating device. While it may be applied to treat a gas stream in various ways, it is particularly suited for application as a liquid bath gas cleaner and will therefore be described in this connection.

In the operation of many cleaners of this general type, the incoming dirty gas entrains and carries liquid to a separating medium in the form of one or more cleaning pads extending across the gas flow path in a separation chamber, the dust and liquid content of the gas stream being intercepted by the pads as the clean gas flows therethrough. Numerous structures have been devised to effect the entrainment of the liquid in the gas stream.

In some cleaners, such as that exemplified by Fitch et al. U.S. Patent 2,309,838, granted February 2, 1943, all of the dirty gas to be cleaned is first directed downwardly against the surface of the liquid bath where, due to impingement of the gas stream thereagainst, the surface of the bath is agitated and liquid entrained in the gas stream and carried upwardly to the cleaning pads. One disadvantage of such a cleaner is that the operating resistance of the cleaner is relatively high, largely because of the work done by the entire gas stream in following a somewhat tortuous path in picking up the liquid from the bath. Another disadvantage is that the operating range is relatively limited: at the lower end of the range because the gas volume must exceed a predetermined minimum to entrain a sufficient amount of liquid; and, at the upper end because the operating resistance of the cleaner to gas flow increases at a relatively fast rate as the gas volume increases.

These disadvantages are substantially minimized in a device of the type exemplified by my co-pending joint application with Nutting, Serial No. 308,454, filed September 8, 1952, now U.S. Patent No. 2,889,004, wherein the entire gas stream is directed axially into the chamber and entrains liquid from an apertured plate extending across the inlet to the separating chamber. A conduit extending from the supply reservoir to the plate is provided for feeding the liquid at a controlled rate to the top surface of the plate where the liquid flows to the edges of the apertures and is picked up by the gas flowing through these apertures. While this cleaner has been found to be eminently satisfactory in service, it requires the use of a pump-motor assembly for feeding the liquid from the bath to the plate or, in a modification, positioning the reservoir very closely below the apertured plate so that the pressure drop across the plate, in terms of the equivalent height of liquid, will exceed the distance from the surface of the liquid supply to the top of the plate.

An object of the present invention is to provide a gas treating device which utilizes the gas flow to supply liquid to the separating chamber while at the same time exerting a relatively low resistance to gas flow.

Another object is the provision of a device having a liquid conveying arrangement which functions to supply a controlled amount of liquid to the separating chamber throughout an operating gas flow range.

A further object is provision of a relatively inexpensive device having the foregoing operating characteristics.

Broadly speaking, my invention contemplates a device in which the total gas flow to be treated flows into the treating chamber by way of at least two separate paths. A first portion of the total gas flow is admitted directly to the chamber while a second portion is caused to flow first into conduit means which extends from the chamber to a liquid sump and serves as a passageway for liquid to be carried in particulate form by the second portion gas flow to the treating chamber. By admitting at least a part of the second portion flow into the conduit means adjacent the level of liquid admitted to the conduit means, an action is obtained which results in the liquid being reduced to finely divided particles readily susceptible of entrainment in the second portion of gas flow. One specific advantage obtained with such an arrangement is the relatively low resistance to gas flow resulting from the utilization of only a portion of the total gas flow to convey liquid from the sump to the chamber.

In one embodiment, my invention includes providing the conduit means in the form of two or more pipes with progressively increasing cross-sectional areas in the direction of second portion gas flow to provide peripheral gas inlets for the admission of additional "lifting" gas flow somewhat above the gas inlets admitting "breaking up" gas flow. In other embodiments, means are provided to control the rate at which liquid flows into the conduit means.

The invention is illustrated in the accompanying drawing wherein.

Figure 1:
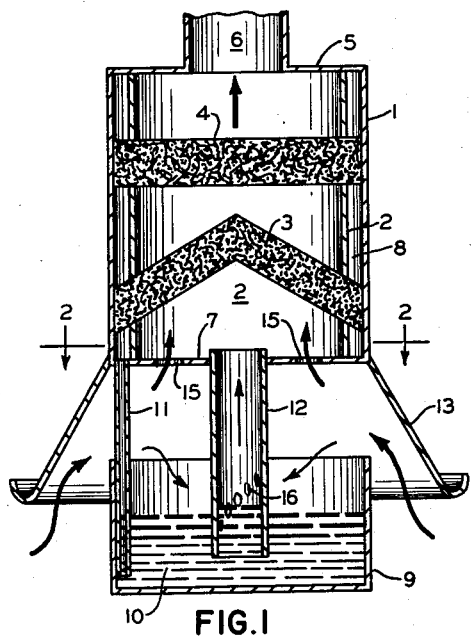
Figure 1 is a vertical sectional view of a device embodying the invention.
Figure 2:
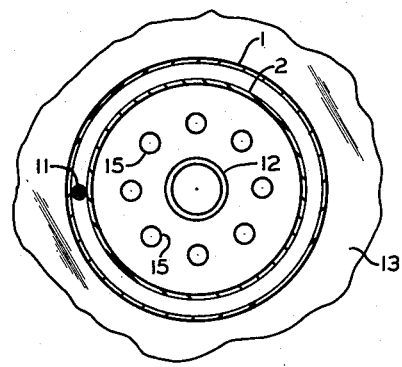
Figure 2 is a horizontal sectional view corresponding to one taken along the line 2—2 of Figure 1.

The air cleaner illustrated in Figures 1–2 includes: an outer vertically disposed cylindrical shell or casing 1; an inner coaxially disposed cylinder 2 forming a treating or separating chamber, also designated 2, which defines the path for gas flow through the casing, this chamber being horizontally divided by a lower conically-shaped pad 3 and upper flat pad 4; a chamber top wall having a central clean gas outlet 6; a chamber entrance member shown as an apertured plate 7 extending across the chamber inlet and being radially extended to close the bottom of annular space 8 between the casing 1 and cylinder 2; a liquid sump 9 spaced downwardly from the chamber inlet and containing a supply of liquid such as oil 10; an oil drainage tube 11 extending from the annular space 8 downwardly to the sump 9 to accommodate oil which drains from the pads 3 and 4 into the space 8; a vertically disposed pipe 12 having its upper end open to the chamber 2 and its open lower end immersed in the oil in the sump; and a rain skirt 13.

The plate 7 has a central opening which receives the open upper end of pipe 12. The plate is also provided with a series of holes 15 spaced radially from the central opening. These holes while shown as being circular and spaced equally from the central opening, may be of any configuration and location which will provide generally uniform distribution of gas flow entering the chamber therethrough. The holes 15 are sized so that with the cleaner operating within the normal gas flow range, the velocity of gas flowing through these holes will be sufficiently high to pick up oil which migrates on the surface of the plate to the edges of the holes. The explanation of this liquid pickup principle of operation is found in the aforementioned U.S. Patent 2,889,004.

The lower portion of pipe 12 is provided with a series of relatively small holes 16 in the wall. These holes extend from below the static liquid level in the sump progressively upward to a point somewhat above this level. While these holes are shown in a spiral arrangement in the wall of the pipe, it is to be understood that they may be arranged in zig-zag fashion or directly above one another. The spiral arrangement has been found to be satisfactory for those applications where the diameter of the holes is slightly larger than the distance between the centers of adjacent holes.

The general operation of the invention, when used as a cleaner, is as follows. The gas or air to be cleaned flows into the separating chamber 2 through the holes 15 (heavy arrows in Figure 1) and by way of pipe 12 (light arrows in Figure 1). The air from these two paths then flows through the pads 3 and 4, which may be of any suitable viscous impingement type such as crimped wire formed into a mass of desired density, and thence to the outlet 6. The air flow through pipe 12 carries oil in a finely divided state up the pipe to the downstream side of the pad 3. Some of the oil particles will be carried directly into contact with the pad while other oil particles will tend to fall to the surface of the plate 7. The oil on the surface of the plate tends to migrate to the edges of holes 15 where it forms into shoulder-like masses which are picked up and carried to the pad 3 by the air flowing upwardly through these holes. The conical pad is thus being fed continuously with oil droplets or particles which coat the pad material and catch the dust and other particulate matter in the air flowing through the pad. Oil and dirt drain outwardly from the pad 3 by virtue of its conical shape and is passed through tube 11 to the sump where the dirt settles out and the oil becomes available for recirculation.

The principle by which oil is circulated from the sump to the separating chamber will now be explained. The flow of air through the cleaner, which results from an air moving source not shown, causes a pressure differential to exist across the plate 7 and between the inside and outside of pipe 12. As a result, oil tends to rise within the pipe 12. The height to which the oil would rise within the pipe if it were imperforate would be equal, in terms of equivalent head of oil, to the pressure differential between the inside and outside of the pipe. Thus, for example, if the pressure differential were equal to one inch of oil, the oil would rise one inch within the pipe. However, since the pipe wall is provided with holes 16, air flows into the pipe by way of these holes and agitates the liquid elevated therein so that it is impossible to ascertain any distinct level to which the oil rises. While the drawing shows an undisturbed and elevated level of liquid in the conduit means, this is merely to indicate that the level in the conduit means is above the sump level. In this connection, it may be noted that with the holes 16 spaced at progressively higher points in the pipe, there will always be a hole at or near the surface of the liquid in the pipe. Thus, the agitation and "breaking up" of the oil will occur, it is believed, partly from impingement of air against the surface of the oil where the surface of the oil is in or near the path of air entering particular holes, and partly from a bursting or bubbling action where the air enters a hole which is covered by the oil. It will of course be apparent that air will enter those holes completely covered by oil only if the equivalent head of oil covering the hole is less than the pressure differential existing between the inside and outside of the pipe.

Since a substantial part of the energy of the air entering the lower holes 16 is expended in agitation of the oil, the upper holes 16 spaced sufficiently above the surface of the oil in the pipe to be out of the "breaking up" zone permit the introduction of additional air for carrying liquid particles up the pipe. Additionally, the turbulence within the pipe is sufficiently great that some particles strike the walls of the pipe in their upward path and coat the inside surface of the pipe. Some of this oil is also re-entrained by the air flow entering the upper holes 16.

With the cleaner of Figure 1, the rate at which oil is discharged from the upper end of pipe 12 is partly dependent, with a given total air flow through the cleaner, upon the height of the pipe. With an increase in pipe height, the oil circulation rate is decreased and vice versa. This characteristic may be utilized in practice by providing a pipe 12 of a height calculated to result in a predetermined oil circulation at the particular air volume contemplated for the cleaner.

Figure 3:
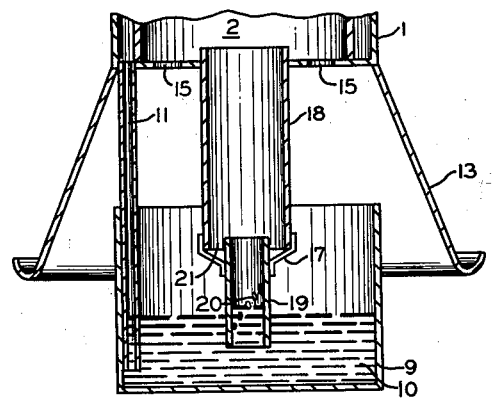
Figure 3 is a vertical sectional view of the lower portion of a device embodying a modification of the invention, this view showing the conduit means in the form of two pipes of different cross-sectional area.

In some applications of the device however, it may be desirable to have the sump spaced a considerable distance below the chamber and also obtain a relatively high rate of liquid circulation. This may be accomplished in one embodiment of my invention by arranging the conduit means as shown in Figure 3 with an upper diametrically larger pipe and a lower diametrically smaller pipe, the pipes being axially aligned and secured together by suitable means such as straps 17. For clarity in description the upper pipe will be called a "lifter" 18, and the lower pipe a "meter" 19. The holes 20 in the walls of the meter are arranged similarly to the holes 16 shown on the single pipe of Figure 1.

The lifter 18 and meter 19 are preferably disposed so that the lower end of the lifter receives and laps the upper end of the meter to define an annular inlet 21 spaced upwardly from the oil level in the sump. The basic operation of the meter is substantially like that described for the conduit means in the form of a single pipe 12, it being understood that with the meter being, in one sense, a short pipe 12, the quantity of oil discharged out the top of the meter is relatively high. The oil droplets discharged out of the upper end of the meter are entrained in the air flow entering the annular inlet. The energy imparted by this air flow entering the annular inlet is utilized to carry a relatively larger quantity of oil to a relatively higher chamber than with the single pipe arrangement.

In the arrangements shown in Figures 1–3, the rate of oil circulation from the sump to separating chamber is dependent upon a number of factors. One factor is the size, number and shape of the air inlet openings 16 and 20 in the pipe 12 and meter 19 respectively. This factor may be controlled initially in the construction of the cleaner. Another factor affecting the oil circulation rate is the distance between the plate 7 and the operating oil level in the sump. This, of course, may also be controlled in the construction or may be changed by varying the level of oil in the sump in field operation. A third factor affecting the rate of oil circulation is the pressure drop across the plate 7. This pressure drop progressively increases as the air volume through the cleaner increases and thus, when the cleaner is used in an application where the air flow varies, the rate of oil circulation will vary with changes of air volume since the pressure differential existing between the inside and outside of the conduit means is a function of pressure drop across the plate 7.

In certain applications, it is desirable to circulate oil at a rate which is just sufficient to keep the pad 3 coated therewith and draining at a rate which carries the separated dust back to the sump. While minor variations in this rate have little effect on the operation of the cleaner, a substantial decrease in circulation may result in the pad 3 being too dry to retain the dust which impinges thereagainst or, conversely, a substantial increase may result in oil carry-over and an increased resistance to the air flow through the chamber.

Figure 4:
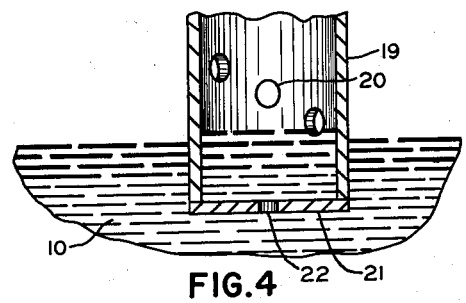
Figure 4 is an enlarged vertical sectional view of the lower end of the conduit means provided with an orifice plate for limiting the rate of liquid flow into the conduit means.
Figures 5, 6:
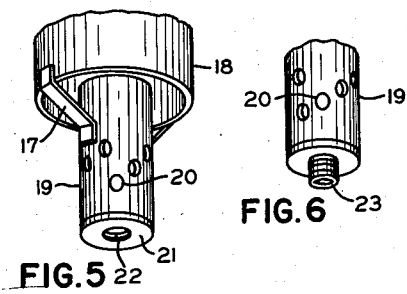
Figure 5 is a fragmentary perspective view of the lower end of the conduit means having the orifice plate of Figure 4.
Figure 6 is a fragmentary perspective view of the conduit means of Figure 5 provided with a nipple in the orifice plate.

The variation in oil circulation due to changes in air volume through the cleaner may be substantially minimized in the modification of my invention illustrated in Figures 4–6. In this modification plate 21 having a sized orifice 22 is disposed across the open lower end of meter 19. The orifice is sized to permit the desired minimum quantity of oil to enter the meter at the lowest anticipated operating air flow. While an increase in air volume will result in a slight increase in oil circulation, the increase is at a much slower rate than with an unrestricted oil inlet on the meter. To insure that the oil enters the meter only through the orifice 22, the air inlet holes 20 of the meter are disposed, relative to the level of oil in the sump, with the lowest hole above the static oil level. Since it may be desirable to change the oil circulation for a given operating air volume, the orifice 22 may be in the form of a hole adapted to receive a hollow plug 23 which changes the effective flow opening. This arrangement permits a relatively convenient method of changing the circulation rate of a cleaner operating in the field.

Figure 7:
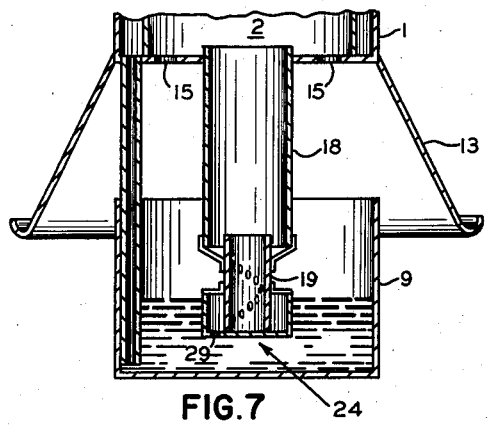
Figure 7 is a vertical sectional view of the lower portion of a device provided with a supplementary reservoir at the lower end of the conduit means.
Figure 8:
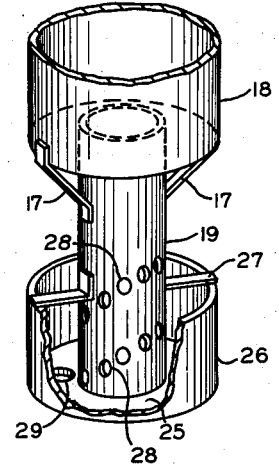
Figure 8 is an enlarged fragmentary perspective view of the supplementary reservoir and conduit means of Figure 7.

A cleaner including preferred means for controlling the circulation rate of the oil is illustrated in Figures 7–8. An upwardly open supplementary reservoir generally designated 24 and having a bottom wall 25 and circumferential wall 26 is secured by angles 27 or in any other suitable manner to the meter 19 to form an annular wall space around the lower portion of the meter, the bottom end of the meter being closed by the bottom wall of the reservoir. The meter holes 28 extend downwardly to the bottom wall of the reservoir.

An orifice 29 of predetermined size, preferably in the bottom wall 25 of the reservoir, is provided to serve as an inlet to the reservoir from the sump 9. Oil from the sump must flow through the orifice 29 and thence through one of the lower holes 28 to enter the meter. By means of this arrangement, the rate of oil flow into the reservoir 24 is, with a given size orifice 29, entirely dependent upon the level of oil in the sump 9. A relatively higher level results in a relatively greater head of oil at the orifice 29, and vice versa. Thus, in a cleaner application wherein it is desirable to have a constant rate of oil circulation to the separating chamber irrespective of variations in air flow and plate pressure drop within the operating range, the orifice is sized, relative to the operating level of oil to be maintained in the pump, to permit the oil to flow into the reservoir at the desired rate. The oil flowing into the reservoir enters the meter through the lower holes 28 and is broken up and entrained in the conduit means air stream as heretofore explained. A change in the rate of circulation may, of course, be accomplished by changing the oil level in the sump 9, or by changing the size of orifice 29. In the typical operations of the device as an oil bath gas cleaner including a supplementary reservoir, the oil rate requirements are sufficiently low that the reservoir is visually almost "dry." In other words, the level of oil in the reservoir approximates a "film" or relatively thin layer rather than an easily measurable standing level.

Figure 9:
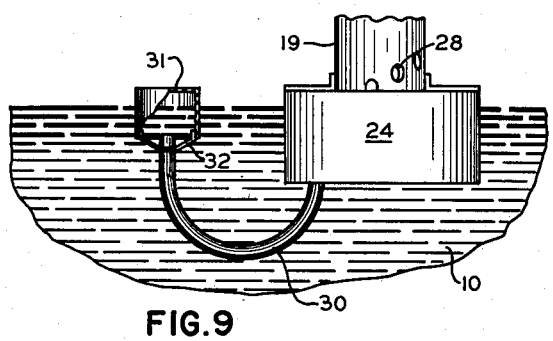
Figure 9 is an elevational view of the supplementary reservoir provided with means for obtaining a constant flow of liquid to the reservoir irrespective of liquid level variations.
Figure 10:
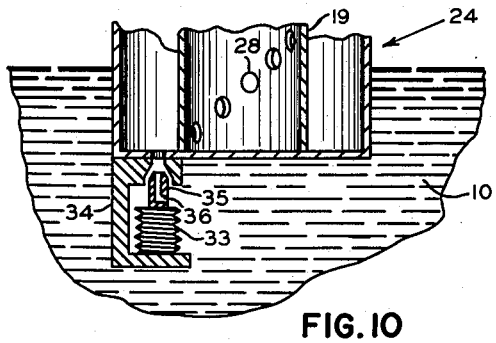
Figure 10 is a fragmentary vertical sectional view illustrating thermostatic means arranged to control the effective size of the liquid inlet to the supplementary reservoir.

Some of the holes 28 are located above the rim of reservoir wall 26. While these holes are not necessary for proper operation, they are useful to effect self-priming of the oil in case the sump should be filled with oil to a level above the upper rim of the reservoir. While in such a case the rate of oil circulation would not be controlled by the size of orifice 29, the possibility of operating with dry pads would be avoided.

Where the rate of oil circulation is critical, several additional refinements such as illustrated in Figures 9 and 10 may be added to control the rate. In Figure 9, a flexible tube 30 is placed in communication with orifice 29 on one end and on the other end is attached to a float 31 by means of a strap 32 so that the head of oil causing flow into the tube and reservoir 24 will be independent of changes of oil level in the sump. An added advantage of this arrangement is that the oil flowing into the reservoir for circulation to the separating chamber tends to be cleaner when taken from near the surface of the sump rather than through an inlet closer to accumulated sludge on the sump bottom.

While changes in viscosity of a given liquid have been heretofore ignored in the explanation of operation, such viscosity changes occurring in liquids such as oil will materially affect the circulation rate. The effect of such changes resulting from varying temperatures can be minimized by utilizing a thermostatically responsive member to vary the effective open area of the liquid inlet between the sump and conduit means. Thus, in Figure 10 a bellows type of thermostatically responsive element 33 is mounted in bracket 34 to move a restricting member 35 towards or away from the hole 29 upon an increase or decrease in temperature respectively, thereby varying the effective size of hole 29. Preferably, the restricting member 35 includes a built in bypass 36 which is sized to permit a minimum oil flow into the reservoir when the member 35 closes the hole 29 at or above the contemplated maximum temperature.

While the device has been illustrated and described as a cleaner which receives atmospheric air to be cleaned, it may be applied with modifications to closed system such as a gas pipe line. In another application, the device may be adapted to operate as an evaporative cooler by using water instead of oil, and additional applications will be readily apparent to those skilled in the art.

Having described my invention, I claim:

1. In a liquid bath gas treating device: a chamber defining a path for the total flow of gas to be treated; a liquid sump containing a supply of liquid to be conveyed to said chamber; inlet means to said chamber having a relatively large gas admitting area for admitting a first and major portion of said total gas flow directly to said chamber; and conduit means of substantially smaller cross sectional area relative to the cross sectional area of said chamber extending from said chamber to said sump to define a separate, confined path for the flow of a second and minor portion of said total gas flow with liquid in particulate form entrained therein, said conduit means including means for admitting liquid from said sump into its lower portion, first gas inlet means for admitting a minor part of said second portion of gas flow into said conduit means adjacent the level of liquid in said conduit means, and second gas inlet means spaced from said first gas inlet means for admitting the major part of said second portion of gas flow into said conduit means, the gas admitting area of said conduit means being sufficiently small relative to said gas admitting area of said chamber to constrain said total gas flow to divide into said major and minor portions.

2. In a liquid bath gas treating device: a chamber defining a path for the total flow of gas to be treated; a liquid sump below said chamber, said sump containing a supply of liquid to be elevated to said chamber; means pervious to gas flow extending across the inlet of said chamber and presenting a relatively large gas admitting area for admitting a first and major portion of said total gas flow directly to said chamber; and, vertically disposed conduit means of small cross sectional area relative to said chamber cross sectional area extending from said sump to said chamber to provide a separate, confined passage for the combined flow of a second and minor portion of said total gas flow and liquid in a finely divided state, said conduit means having liquid inlet means in its lower portion for admitting liquid from said sump thereinto and having first gas inlet means to admit at least a part of said second gas flow portion at a point closely adjacent the operating liquid level in said conduit means to reduce the liquid in the lower portion of said conduit means into a finely divided state, and second gas inlet means spaced upwardly from said first gas inlet means to admit the remaining part of said second gas flow portion, the gas admitting area of said conduit means being sufficiently small relative to said gas admitting area of said chamber to constrain said total gas flow to divide into said major and minor portions.

3. The gas treating device of claim 2 wherein: said gas flow pervious means is a plate-like member having a plurality of apertures.

4. In a liquid bath gas treating device: a chamber defining a path for the total flow of gas to be treated; a liquid sump below said chamber, said sump containing a supply of liquid to be conveyed to said chamber; means defining an inlet for admitting a first and major portion of said total gas flow directly into said chamber; and, conduit means defining a path for the flow of a second and minor portion of said total gas flow, said conduit means including an upper pipe of one interior cross sectional area having its upper end in communication with said chamber and its lower end spaced above the static level of liquid in said sump, and a lower pipe of another interior cross sectional area axially aligned with said upper pipe and having its upper end spaced from said lower end of said upper pipe for admitting a first part of said second portion gas flow into said conduit means at the adjacent ends of said upper and lower pipes, said lower pipe having liquid inlet means in its lower portion for admitting liquid from said sump into said lower pipe and gas inlet means for admitting a second part of said second portion gas flow into said lower pipe in close proximity to the operating liquid level in said lower pipe.

5. The gas treating device of claim 4 wherein: said pipe is cross-sectionally larger than said lower pipe and the lower end of said upper pipe is disposed with the upper end of said lower pipe extending therewithin to form an upwardly directed annular gas inlet between the walls thereof.

6. The gas treating device of claim 5 wherein: the gas inlet means in the wall of said lower pipe is above the normal static liquid level in said sump.

7. In a liquid bath gas treating device: a chamber defining a path for the total flow of gas to be treated; a liquid sump below said chamber, said sump containing a supply of liquid to be conveyed to said chamber; first gas inlet means presenting a relatively large open area for admitting a first and major portion of said total gas flow to said chamber; conduit means having a substantially reduced cross sectional area relative to the cross sectional area of said chamber extending from said sump to said chamber and providing a separate, confined passage for the flow of a second and minor portion of said total gas flow with liquid in particulate form entrained therein, said conduit means having liquid inlet means in its lower portion and gas inlet means for admitting at least a part of said second portion gas flow adjacent the normal operating level of liquid in said conduit means; and a supplementary reservoir including liquid admission means interposed between the liquid in said sump and the lower portion of said conduit means, said reservoir serving, under normal operating conditions, to restrict the admission of liquid to said conduit means to a rate controlled by the level of liquid in said sump.

8. In a liquid bath gas treating device: a chamber defining a path for the total flow of gas to be treated; a liquid sump below said chamber, said sump containing a supply of liquid to be conveyed to said chamber; inlet means to said chamber presenting a relatively large open area for admitting a first and major portion of said total gas flow directly to said chamber; an upwardly open cup-like reservoir positioned in said sump with the upper edge of its vertical walls above the normal static liquid level in said sump, said reservoir having a liquid inlet means for admitting liquid thereinto solely from said sump; and conduit means having a substantially reduced cross sectional area relative to the cross sectional area of the chamber extending between said reservoir and said chamber to define a separate, confined path for the flow of a second and minor portion of said total gas flow, said conduit means including means for admitting liquid from said reservoir into the lower portion of said conduit means and means for admitting at least a portion of said second gas flow portion into the lower portion of said conduit means for breaking up the liquid therein into a finely divided state to facilitate entrainment thereof in said second gas flow portion, the open area of said gas inlet means of said conduit means being sufficiently small relative to the open area of said chamber gas inlet means to constrain said total gas flow to divide into said major and minor portions.

9. The gas treating device of claim 8 wherein: the second gas flow portion inlet means includes a series of individual apertures of small size relative to the cross-sectional area of said conduit means, said apertures being located at progressively higher points in the wall of said conduit means.

10. The gas treating device of claim 8 wherein: the conduit means includes an upper and a lower portion, the upper portion being of sufficiently larger cross-sectional area than the lower portion as to provide a peripheral space between the walls of said portions when concentrically disposed, said upper portion being disposed to receive into its lower end both the finely divided liquid discharged from the upper end of the lower portion and the part of the second portion gas flow carrying the finely divided liquid upwardly in the lower portion.

11. Apparatus for conveying liquid from a sump to a relatively higher spaced chamber having gas inlet means of relatively large open area for admitting directly to said chamber a major portion of the total gas flow admitted for treatment, comprising: conduit means of substantially reduced cross sectional area relative to the cross sectional area of said chamber extending from said sump upwardly to said chamber to provide a separate, confined path for the flow of a minor portion of said total gas flow with the liquid entrained therein from said sump to said chamber, the upper end of said conduit means being in communication with the upstream space in said chamber and the lower portion of said conduit means being adapted to receive liquid from said sump; and means for admitting said minor portion of the total gas flow to be treated into the lower portion of said conduit means to break the liquid up into a finely divided state and carry it to said gas treating chamber by way of said conduit means, said means for admitting said minor portion of total gas flow including, lower gas inlet means for admitting a first part of said minor portion of said total gas flow immediately adjacent the level of liquid in said conduit means, and upper gas inlet means for admitting the remaining part of said minor portion of total gas flow, said gas inlet means of said conduit means presenting a sufficiently small open area, relative to the open area of said gas inlet means of said chamber, to constrain said total gas flow to divide into said major and minor portions.

12. The apparatus of claim 11 including: supplementary reservoir means interposed between the liquid in said sump and the lower portion of said conduit means, said reservoir including liquid inlet means for admitting liquid flow from said sump into said reservoir, said reservoir and liquid inlet means serving, under normal operating conditions, to restrict the admission of liquid into said reservoir to a rate dependent upon the level of liquid in said sump relative to the location of said liquid inlet means and independent of the rate at which liquid is carried up said conduit means.

13. The apparatus of claim 12 including: means for increasing and decreasing the effective flow opening of said liquid inlet means in response to decreasing and increasing temperatures respectively of the liquid in said sump.

14. The apparatus of claim 12 including: pipe means having one end connected to the liquid inlet means; and float means for maintaining the opposite end of said pipe means at a constant distance below the level of liquid in said sump.

15. In a liquid bath gas cleaner: a separating chamber of relatively large cross-sectional area defining a path for the total flow of gas to be cleaned and having viscous impingement separating means extending across the flow path; a liquid sump below said chamber, said sump containing a supply of liquid to be conveyed in finely divided form to said chamber; a plate extending transversely across the inlet to said chamber, said plate including a plurality of apertures for admitting a major portion of said total gas flow directly and axially into said chamber; an upwardly open cup-like reservoir positioned in said sump with the upper edge of its vertical walls above the normal static liquid level in said sump, said reservoir having liquid inlet means for admitting liquid from said sump; an upper pipe of substantially reduced cross sectional area relative to said chamber cross sectional area having its upper end in communication with the space between said separating means and said apertured plate; a lower pipe of smaller cross section aligned with said upper pipe and disposed with its open upper end adjacent to the open lower end of said upper pipe to form an annular gas inlet therebetween and its lower end within said reservoir, said lower pipe including means for admitting liquid from said reservoir thereinto and means for admitting a minor portion of said total gas flow at a point sufficiently close to said liquid in said lower pipe to break the liquid up into a finely divided state and carry it to the top of said lower pipe where it is entrained and carried upwardly by the gas flow portion entering said annular inlet.

References Cited in the file of this patent

UNITED STATES PATENTS

| | | |
|---|---|---|
| 1,103,789 | Macey | July 14, 1914 |
| 1,564,949 | Cramer | Dec. 8, 1925 |
| 1,702,804 | Winslow | Feb. 19, 1929 |
| 1,828,816 | Pierson | Oct. 27, 1931 |
| 1,851,427 | Hinkle | Mar. 29, 1932 |
| 1,946,291 | Miller | Feb. 6, 1934 |
| 2,083,649 | Heglar | June 15, 1937 |
| 2,387,278 | Lowther | Oct. 23, 1945 |

UNITED STATES PATENT OFFICE
CERTIFICATION OF CORRECTION

Patent No. 2,966,958                                January 3, 1961

Robert W. Sexton

It is hereby certified that error appears in the above numbered patent requiring correction and that the said Letters Patent should read as corrected below.

Column 2, line 69, after "wall" insert -- 5 --; column 5, line 65, for "pump" read -- sump --; column 7, line 49, after "said" insert -- upper --.

Signed and sealed this 30th day of May 1961.

(SEAL)
Attest:

ERNEST W. SWIDER                              DAVID L. LADD
Attesting Officer                               Commissioner of Patents